US010216917B2

(12) United States Patent
Johnson

(10) Patent No.: US 10,216,917 B2
(45) Date of Patent: *Feb. 26, 2019

(54) IDENTITY VALIDATION USING LOCAL ENVIRONMENT INFORMATION

(71) Applicant: International Business Machines Corporation, Armonk, NY (US)

(72) Inventor: Richard C. Johnson, Selkirk, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,555

(22) Filed: Jul. 17, 2017

(65) Prior Publication Data

US 2019/0018948 A1 Jan. 17, 2019

(51) Int. Cl.
*G06F 21/34* (2013.01)
*G06F 21/31* (2013.01)

(52) U.S. Cl.
CPC ............ *G06F 21/34* (2013.01); *G06F 21/316* (2013.01)

(58) Field of Classification Search
CPC ..... G06F 21/316; G06F 21/34; H04L 63/0853
See application file for complete search history.

(56) References Cited

U.S. PATENT DOCUMENTS

| 7,447,494 | B2 | 11/2008 | Law et al. |
| 8,670,381 | B1 | 3/2014 | Houri |
| 8,763,101 | B2 | 6/2014 | Counterman |
| 8,973,122 | B2 | 3/2015 | Beck et al. |
| 9,805,370 | B1 | 10/2017 | Quigley et al. |
| 9,881,305 | B1* | 1/2018 | Lewis .................. G06Q 20/405 |
| 2002/0120846 | A1 | 8/2002 | Stewart et al. |
| 2008/0046362 | A1 | 2/2008 | Easterly |
| 2008/0313079 | A1 | 12/2008 | Van Bosch et al. |
| 2009/0260064 | A1 | 10/2009 | McDowell et al. |
| 2011/0029359 | A1 | 2/2011 | Roeding et al. |
| 2012/0185910 | A1* | 7/2012 | Miettinen ............... G06F 21/31 726/1 |
| 2013/0169434 | A1* | 7/2013 | McCown ............... G08B 21/00 340/540 |
| 2014/0337956 | A1 | 11/2014 | Korgaonkar |

(Continued)

FOREIGN PATENT DOCUMENTS

| EP | 3107051 A1 | 12/2016 |
| WO | 2003067506 A2 | 8/2003 |
| WO | 2008089142 A2 | 7/2008 |

OTHER PUBLICATIONS

IBM, "Verification of a Transaction Utilizing a Trusted Third Agent for Independent Feedback," http://ip.com/IPCOM/000013371, An IP.com Prior Art Database Technical Disclosure, IP.com No. IPCOM000013371D, IP.com Electronic Publication Date: Jun. 18, 2003, 6 pgs.

(Continued)

*Primary Examiner* — David J Pearson
(74) *Attorney, Agent, or Firm* — Jared L. Montanaro

(57) ABSTRACT

A processor may initiate a first verification event. The processor may identify two or more devices that are within a predetermined area of the processor during the initiating of the first verification event. The processor may verify an identity of a verified user based on the two or more devices. The processor may process the first verification event in response to verifying the identity of the verified user.

16 Claims, 6 Drawing Sheets

(56) References Cited

U.S. PATENT DOCUMENTS

| | | | |
|---|---|---|---|
| 2015/0006904 A1* | 1/2015 | Kimoto | H04L 63/0861 713/186 |
| 2016/0183064 A1* | 6/2016 | Wouhaybi | H04W 4/08 455/456.3 |
| 2016/0191540 A1* | 6/2016 | Fuka | H04L 63/107 726/4 |
| 2016/0219411 A1 | 7/2016 | Tenant de la Tour et al. | |
| 2016/0234633 A1 | 8/2016 | Huang | |
| 2016/0277380 A1 | 9/2016 | Wagner et al. | |
| 2017/0032356 A1* | 2/2017 | Deshpande | G06Q 20/3224 |
| 2017/0255920 A1 | 9/2017 | Prakash et al. | |

OTHER PUBLICATIONS

Basharat et al., "Prevention of Online Transaction Using MAC Address of the Machine, OTP Two Layer Model to Identify Legitimate User," https://www.researchgate.net/publication/307902050_Prevention_of_Online_Transaction_Using_MAC_Address_of_the_Machine_OTP_Two_Layer_Model_to_Identify_Legitimate_User, Sep. 8, 2016, printed May 15, 2017, 4 pgs.

Libelium, "Smartphone, cellular and hands-free mobile phone detection," http://www.libelium.com/products/meshlium/smartphone-detection/, printed Jul. 7, 2017, 5 pgs.

Wikipedia, "Multi-factor authentication," https://en.wikipedia.org/wiki/Multi-factor_authentication, printed Jul. 7, 2017, pp. 1-7.

Mell et al., "The NIST Definition of Cloud Computing," Recommendations of the National Institute of Standards and Technology, U.S. Department of Commerce, Special Publication 800-145, Sep. 2011, 7 pgs.

Accelerated Examination Support Document, U.S. Appl. No. 15/847,107, filed Dec. 11, 2017, 19 pgs.

Johnson, "Identity Validation Using Local Environment Information," U.S. Appl. No. 15/847,107, filed Dec. 19, 2017.

List of IBM Patents or Patent Applications Treated as Related, Dec. 15, 2017, 2 pgs.

* cited by examiner

IDENTITY VALIDATION USING LOCAL ENVIRONMENT INFORMATION

BACKGROUND

The present disclosure relates generally to the field of identify verification, and more specifically to confirming a user's identity during a verification event based on authorized devices.

During a typical financial transaction, the identity of a person is typically assumed based on one device used by the person. However, nowadays, people often have multiple smart devices on their person at all times, such as wearables and cellphones.

SUMMARY

Embodiments of the present disclosure include a method, computer program product, and system for verifying a user's identity and allowing the processing of a verification event. A processor may initiate a first verification event. The processor may identify two or more devices that are within a predetermined area of the processor during the initiation of the first verification event. The processor may verify an identity of a verified user based on the two or more devices. The processor may process the first verification event in response to verifying the identity of the verified user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
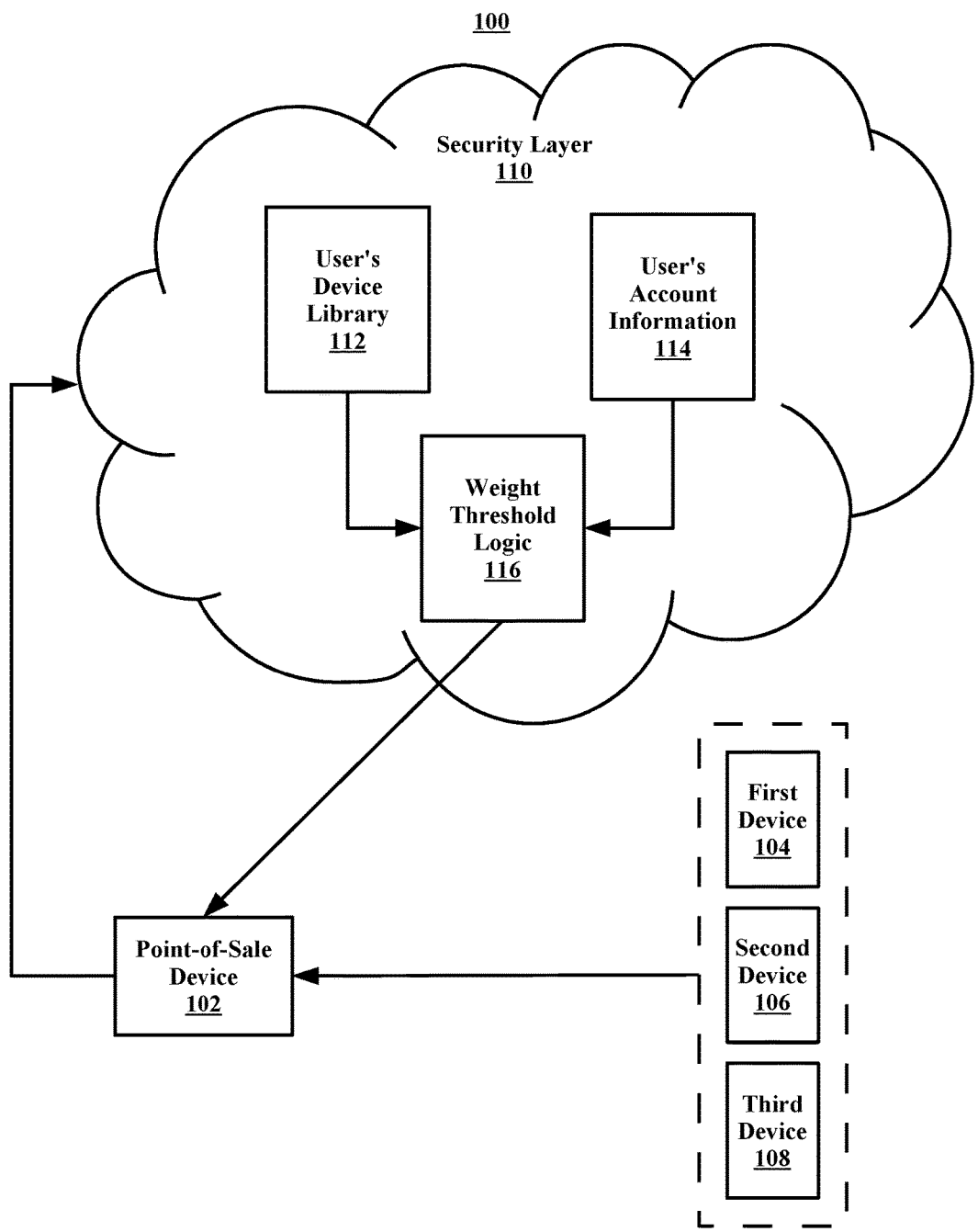
FIG. 1 illustrates a functional block diagram of an example system for validating the identity of a verified user and processing a first verification event, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of identify verification, and more specifically to confirming a user's identity during a verification event based on authorized devices. While the present disclosure is not necessarily limited to such applications, various aspects of the disclosure may be appreciated through a discussion of various examples using this context.

During the course of a day, a verified user may be involved in multiple verification events (e.g., financial transactions, vote entries, plane boarding, library check-outs, etc.). Only on rare occasions may additional information be requested to validate the user's identity. This may lead to multiple instances of fraudulent activity when another person using the user's device is allowed to purchase and/or perform activities under the identity of the user. The verified user or institution processing the verification event (e.g., a financial institution, polling service, airline, etc.) may desire to have extra security when processing the verification event and want more than one device (e.g., a credit card, a debit card, mobile phone, tablet, etc.) to validate the verified user's identity in order to allow the processing of the verification event.

In some embodiments, a processor may initiate a first verification event. For example, a consumer may be purchasing a product and insert a credit card into a point-of-sale (POS) device and the POS device may begin verifying the credit card information (e.g., routing numbers, account numbers, the identity of the owner of the credit card, etc.). In some embodiments, the processor may identify two or more devices that are within a predetermined area of the processor.

Following the example above, the POS device, after initiating the verification of the credit card, may use a radio wave (e.g., WiFi, Bluetooth, etc.) signal to search for a cellphone and a smart watch belonging to the consumer. The POS device may have the radio wave scan for the cellphone and smart watch, and if they are within 5 feet of the POS device, the POS device may proceed with the purchasing of the product. In some embodiments, one of the two or more devices may be the credit card as it may be associated with the consumer.

In some embodiments, the processor may verify an identity of a verified user based on the two or more devices. In some embodiments, the processor may process the first verification event in response to verifying the identity of the verified user.

For example, a flight attendant may be boarding a plane and scan a ticket at a kiosk. The kiosk may identify the name of the flight attendant from the ticket as "Mary." The kiosk, in order to verify that "Mary" is actually the one boarding the plane, may use a Bluetooth signal to scan an area of 10 feet. Within the 10 feet radius of the Bluetooth signal, the kiosk may identify a cellphone, a tablet, and a pair of wireless headphones. The kiosk may verify that the cellphone, tablet, and wireless headphones belong to "Mary." The kiosk, after determining that three devices associated with Mary are within 10 feet of the kiosk, may fully process the scanning of the ticket and flash a green light indicating that "Mary" may now board the plane. The kiosk may determine to fully process the scanning of the ticket because it has determined, with a high degree of confidence (e.g., from the presence of the ticket, the cellphone, the tablet, and the wireless headphones all belonging to "Mary"), that the flight attendant is indeed "Mary" as stated on the ticket. In some embodiments, the time between initiating the verification event and determining to process the verification event may be less than a second.

In some embodiments, when verifying the identity of the user based on the two or more devices, the processor may access a library. The library may include a list of the two or more devices as being authorized by the verified user to allow the processing of one or more verification events. In some embodiments, the processor may determine that the two or more devices belong to the verified user. In some embodiments, the processor may determine that a combination of the two or more devices confirms the identity of the verified user.

For example, during the processing of a purchase using a debit card, a POS device processing the purchase may identify a fitness tracker and a smartphone within 2 feet of the POS device. The POS device, while accessing the debit card information from a financial institution, may additionally access a library associated to the debit card information. The library may identify the fitness tracker and the smartphone (e.g., by a unique identifier associated with both the fitness tracker and smartphone, such as a MAC address) as belonging to the same user that the debit card belongs. The POS device may determine that the combination of the debit card, the fitness tracker, and the smartphone confirms the identity of the user and process the purchase.

In some embodiments, a financial institution may store the library. In some embodiments, a stand-alone application may store the library. In some embodiments, the verified user may supply the library with the two or more devices, such as by registering the devices with their financial institution or with another service. This may allow the verified user to directly associate a trusted device with themself and allow the processing of subsequent verification events to be faster and more secure.

In some embodiments, when determining that the combination of the two or more devices confirms the identity of the verified user, the processor may identify a first device. The first device may be associated with a first weight (e.g., value). In some embodiments, the processor may identify a second device. The second device may be associated with a second weight. In some embodiments, the processor may combine the first weight and the second weight. The processor may determine that the combination of the first weight and the second weight is above a predetermined threshold.

For example, a verified user may be purchasing an item off an online store using their personal computer. The personal computer may identify that it is connected to the verified user's wireless internet via a wireless router and the personal computer may identify the presence of a smart watch owned by the verified user. The personal computer may then identify from a library stored in a financial institution's cloud that the verified user's wireless router and smart watch are registered devices that authenticate the verified user's identity.

The personal computer may additionally identify that the financial institution has associated a value to the router and the smart watch. The financial institution may use a scale of 1 to 100 to indicate how confident they are that each device validates the verified user's identity. The financial institution may also designate a threshold limit of 75 before an online purchase is allowed to process. The wireless router may be given a 70 by the financial institution because being on the verified user's wireless network is a strong indicator that the verified user is indeed making the online purchase. Additionally, the smart watch may be given a 10 because it is a weaker indicator that the verified user is making the online purchase.

The personal computer may then combine the 70 and 10 and determine that the combined value is 80 (e.g., degree of confidence), which is above the threshold limit of 75. This may indicate that there is a strong likelihood (e.g., a high degree of confidence) that the verified user was the individual making the online purchase and that the online purchase should be approved for processing. It should be noted that the scale of 1 to 100 is an example and in practice any number, text, inforgraphic, and/or other information may be used so long as it is capable of acting as a weighting mechanism comparable to a threshold.

In some embodiments, the verification of the user's identity may be done by the financial institution. For example, the personal computer may send information about the devices (e.g., a MAC address or authentication code, which itself may reset every X number of seconds) to the financial institution and receive back an authorization code (e.g., a changing CCV or token), which may verify the user's identity.

In some embodiments, the weights of the first device and the second device may be based on the likelihood that a potential threat (e.g., a person) would have both devices. For example, two devices carried in the same wallet might be stolen together, so the weight for the two devices might be lower than a phone or other device (e.g., smartwatch) that is kept separately.

In some embodiments, when determining that the combination of the one or more devices confirms the identity of the verified user, the processor may identify a first device. The first device may be associated with a first weight. In some embodiments, the processor may identify a second device. The second device may be associated with a second weight. In some embodiments, the processor may combine the first weight and the second weight. The processor may determine that the combination of the first weight and the second weight is below a predetermined threshold. In some embodiments, in response to determining that the combination of the first and second weights is below the predetermined threshold, the processor may prevent the processing of the first verification event. In some embodiments, the processor may also alert the verified user to an attempt to process the first verification event.

For example, a purchaser may try to purchase a product at a store using a digital wallet application on a smartphone. The digital wallet application may be programmed with a feature that allows the purchaser to catalog a list of trusted devices used by the purchaser to a library. The trusted devices may add an additional layer of security that proves the identity is truly that of the purchaser. The digital wallet application may additionally weight each trusted device listed in the library. If the aggregate of weights associated with each trusted device is above the threshold of 80, the digital wallet application may approve the processing of the purchase.

Continuing the example, the digital wallet application may weight the smartphone itself with a value of 50, indicating that the digital wallet application has a moderate degree of confidence that the smartphone alone validates the purchaser's identity. However, the digital wallet application may not be able to identify any more trusted devices around the area (e.g., within 5 feet, etc.). The digital wallet application may prevent the processing of the purchase and alert the purchaser to the prevention of the purchase because the single weight of the smartphone is not above the threshold of 80. In some embodiments, the digital wallet application may ask the purchaser to verify the purchase through tapping a verification icon. In some embodiments, a retailer may be notified by the digital wallet application and ask the purchaser for additional verification of the purchaser identity (e.g., a photo ID, etc.).

In some embodiments, the processor may identify that one device of the two or more devices is not properly communicating with the processor. The processor may identify that the one device is not properly communicating by the processor not being able to determine that the one device belongs to the verified user. In some embodiments, the processor may alert the verified user to activate a communication channel on the one device. In some embodiments, the processor may additionally alert the verified user to add the one device to the library.

For example, a user may be trying to purchase food at a self-checkout station located in a supermarket. The self-checkout station may identify that 3 mobile devices are located within a 10-foot radius of the self-checkout station. The self-checkout station may receive information that 1 of the 3 devices belongs to the user, however a threshold for validating the user's identity has not been met. The self-checkout station may alert the user to turn on a Bluetooth function of a second device in order to meet the threshold. The self-checkout may additionally suggest that the user place the device on the library of trusted devices if not already listed.

In some embodiments, the processor may identify devices not owned by a user and discard the other devices when determining if a threshold is met. Following the example above, the 2 other devices may not belong to the user and the self-checkout station may identify that the 2 other devices do not belong to the user. The check-out station could discard the other 2 devices as noise (e.g., other devices not owned or validated by the user) when determining if the threshold for validating the user's identity is met (e.g., the check-out station may disregard the other 2 devices when making a decision). In some embodiments, the noise produced by other devices in a predetermined may add an additional layer of security when the processor is in communication with the user's device(s) because it may be harder for a potential risk (e.g., a person) to find and intercept the user's device information.

In some embodiments, the processor may determine that certain verification events do not need validation of a verified user's identity from two or more devices. For example, if food is being bought in a grocery store. However, in some embodiments, the processor may determine that certain verification events do need validation of a verified user's identity from two or more devices. For example, if a television is being bought in a grocery store. In some embodiments, only purchases that exceed a given price may trigger multi-device verification.

In some embodiments, the processor may initiate a second verification event. The processor may identify the two or more devices are within a predetermined area of the processor during the initiating of the second verification event. In some embodiments, the processor may determine that the two or more devices belong to the verified user. The processor may then process the second verification event. In some embodiments, the second verification event may be related to the first verification event.

For example, a verified user may have made a first purchase at a mall in one specialty store. The verified user may then try to purchase a second item in a second specialty store. A POS device in the second specialty store, once activated by the verified user's credit card, may identify two mobile devices owned by the verified user are within 3 feet of the POS device and the POS device my identify that a first purchase was made at the same mall. The POS device may process the second purchase based on the aggregate of the two mobile devices and the user's history of purchases at the same mall on the same day. The validation of the verified user's identity during the second purchase (and/or any other subsequent purchases) may add a layer of security to all purchases under the verified user's identity. For example, this may have prevented a person who is not the verified user from using the verified user's credit card to purchase an item at the gas station near the mall (e.g., because no other mobile devices were used and the purchase was not made at the mall; the confidence that the gas station purchase was made by the verified user may be too low for the purchase to be allowed to process).

In some embodiments, the process may identify that one device of the two or more devices has been present during the initiation of both the first verification event and the second verification event. The processor may determine that the one device is not in the library. In some embodiments, the processor may automatically add the one device to the library.

For example, a person may have made one on-line purchase on a laptop and before processing the on-line purchase the laptop may have identified a cellphone, an internet router, and a smart television surrounding the laptop. The cellphone and router together may have reached a threshold level to allow the processing of the on-line purchase (e.g., because the person's identity may have been confirmed to a reasonable degree of confidence).

The person may then make a second on-line purchase on the laptop and before processing the second on-line purchase the laptop may have identified the same cellphone, internet router, and smart television. The laptop may recognize that the smart television has been present during the processing of both the first and second on-line purchase, however the smart television is not in the library being accessed to determine if a threshold level (e.g., degree of confidence) is met. The laptop may then add the smart television to the library.

Referring now to FIG. 1, illustrated is a functional block diagram of an example system 100 for validating the identity of a verified user and processing a first verification event, in accordance with embodiments of the present disclosure. In some embodiments, the system 100 may include a Point-of-Sale (POS) device 102, a first device 104, a second device 106, a third device 108, and a security layer 110. In some embodiments, the security layer 110 may be in the cloud.

In some embodiments, the security layer 110 may include a user's device library 112, a user's account information 114, and weight threshold logic 116. In some embodiments, a verification event (e.g., a transaction) may be initiated by the POS device 102. In some embodiments, the POS device 102 may use a radio signal to identify that the first device 104, the second device 106, and the third device 108 are within a predetermined area (e.g., a radius of inches, feet, a yard, etc.) of the POS device 102.

In some embodiments, after identifying the first through third devices 104-108, the POS device 102 may bundle the information associated with each of the first through third devices 104-108 (e.g., MAC addresses, SSIDs, etc.). In some embodiments, the POS device 102 may access the security layer 110 and search the user's device library 112. In some embodiments, the security layer 110 may be sourced (e.g., provided by) by a financial institution (e.g., a bank) and/or a municipality (e.g., post office, etc.).

In some embodiments, the POS device 102 may identify that the first through third devices 104-108 are in the user's device library 112. In some embodiments, any combination of the first through third devices 104-108 may be identified in the user's device library 112. In some embodiments, the POS device 102 may indicate to the security layer 110 that the first through third devices 104-108 are in the user's device library 112.

In some embodiments, the security layer 110 may access the user's account information 114, which may include the verified user's name, address, routing number, account number, etc. In some embodiments, the security layer 110 may combine the user's account information 114 with the information indicated by the POS device 102 as being confirmed in the user's device library 112 (e.g., that the first through third devices 104-108 are in the user's device library 112). In some embodiments, the security layer 110 may combine the user's device library 112 and the user's account information 114 in the weight threshold logic 116.

For example, the POS device 102 may have identified a smartphone, a Bluetooth headset, and a smart watch as being in the user's device library. Each device (e.g., the smartphone, Bluetooth headset, and smart watch) may have been associated with a weight in the user's device library 112. The security layer 112 may, using the weight threshold logic 116, combine the associated weights of the devices with the user's account information 114. The user's account information 114 may be associated with a verified user, and the user's device library 112 may be associated to the same verified user.

In some embodiments, the weight threshold logic 116 may be sent to the POS device 102. The POS device 102 may determine if a predetermined threshold was met or not met based on the weight threshold logic 116. The POS device 102 may then determine if the verification event should be processed.

Figure 2:
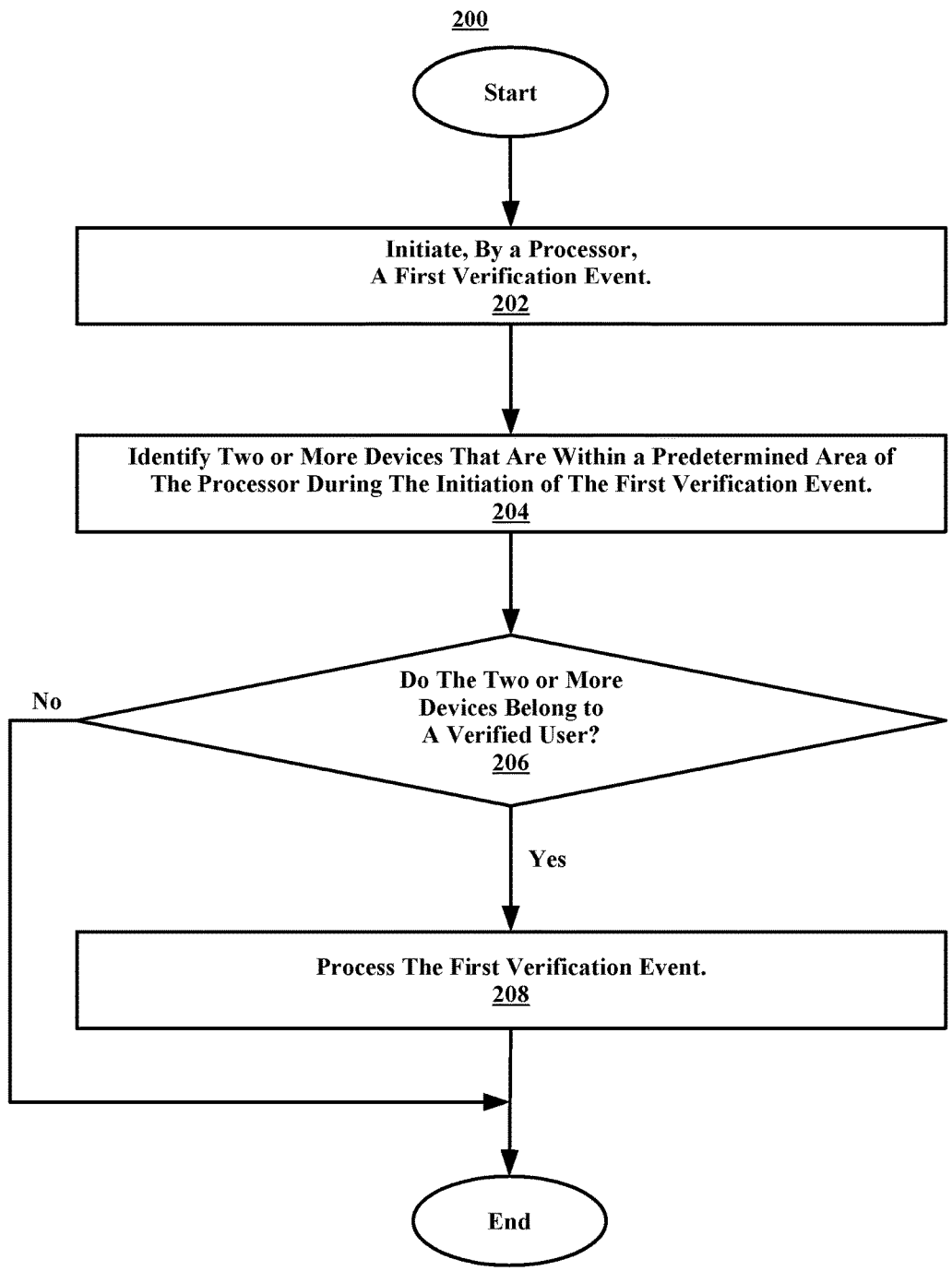
FIG. 2 illustrates a flowchart depicting an example method for allowing the processing of a first verification event, in accordance with embodiments of the present disclosure.

Referring now to FIG. 2, illustrated is a flowchart depicting an example method 200 for allowing the processing of a first verification event. In some embodiments, a processor may perform the method 200. In some embodiments, the method 200 may begin at operation 202. At operation 202, a processor may initiate a first verification event.

After operation 202, the method 200 may proceed to operation 204. At operation 204, the processor may identify two or more devices that are within a predetermined area of the processor during the initiation of the first verification event. After operation 204, the method 200 may proceed to decision block 206. If, at decision block 206, the processor does not verify that the two or more devices belong to a verified user, the method 200 may end.

For example, a user may place their smartphone near a POS device and a Near Field Communication (NFC) (e.g., a radio, such as a Bluetooth device, WiFi, etc.) transaction may begin. The POS device may clearly identify the smartphone owned by the user as being within the NFC area (e.g., 2 inches); however, a smart watch owned by a store clerk pointing to the POS device may also be identified in the NFC area. The POS device may determine that the smart watch does not belong to the user and may not process the transaction. This may be because the identity of the user was not fully verified by the use of their smartphone alone.

If, at decision block 206, the processor does verify that the two or more devices belong to a verified user, the method 200 may proceed to operation 208. At operation 208, the processor may process the first verification event (e.g., approve the transaction). Following the example above, the smart watch may belong to the user and the POS device may identify that both the smartphone and the smart watch are within the NFC area and the POS device may proceed to process the transaction. In some embodiments, after operation 208, the method 200 may end.

Figure 3:
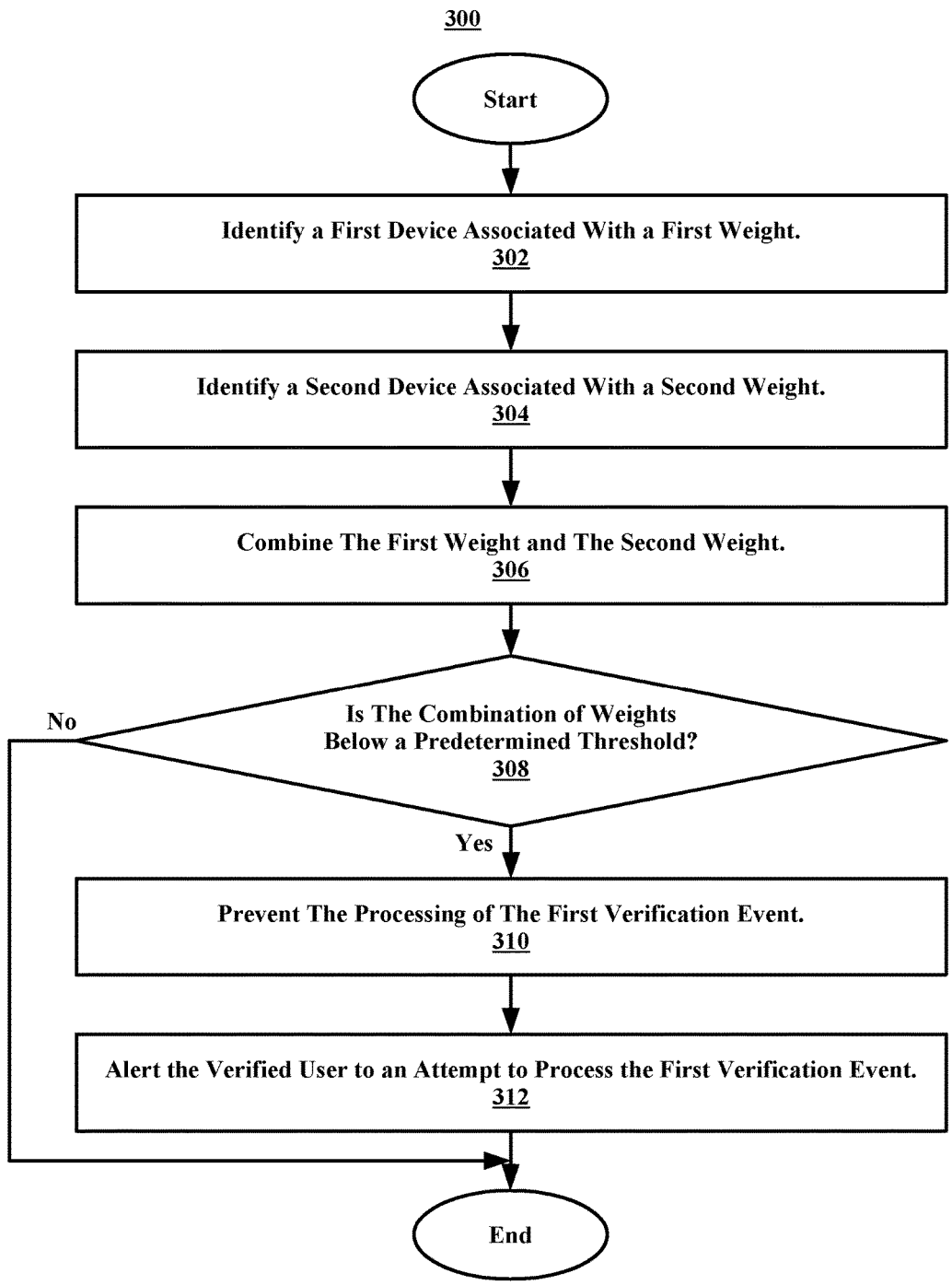
FIG. 3 illustrates a flowchart of an example method for preventing the processing of a first verification event and alerting a verified user to the attempt to process the first verification event, in accordance with embodiments of the present disclosure.

Referring now to FIG. 3, illustrated is a flowchart of an example method 300 for preventing the processing of a first verification event and alerting a verified user to the attempt to process the first verification event, in accordance with embodiments of the present disclosure. In some embodiments, a processor may perform all or some of the operations of the method 300.

In some embodiments, the method 300 may begin at operation 302. At operation 302, a processor may identity a first device associated with a first weight (e.g., value, number, metric, etc.). After operation 302, the method 300 may proceed to operation 304. At operation 304, the processor may identify a second device associated with a second weight.

For example, a library of trusted devices, which may verify a user's identity, may have assigned values to each of the trusted devices. The library may give each trusted device a value between 1 and 100, which may be based on the mobility of the device and the historical usage of the device. For example, the library may weight a fitness tracker with a 30 because the fitness tracker is extremely mobile, but could be taken by someone other than the user. However, the fitness tracker has been at 4 of the last 5 verified transaction events. Additionally, a wireless speaker in the user's home is given a weight of 50 because it is not mobile, but has only been in 1 of the last 5 verified transaction events.

In some embodiments, the weight of a device may be increased the more times the device is present and/or used during a verification event (e.g., transaction, etc.). For example, because the fitness tracker has been present at 4 of the last 5 verified transactions, the library may increase the weight to 50 because it is assumed the fitness tracker is a trusted device that is usually near the verified user. In some embodiments, the processor and/or library may identify devices that are present during a verification event but have never been verified by a user and the processor and/or library may give the devices no weight (e.g., marking the devices as noise).

For example, during every transaction made while at a user's house, a neighbor's Wi-Fi may be identified. A processor verifying devices at the user's house in order to validate the user's identity before the processing of the transaction may identify the neighbor's Wi-Fi and determine (e.g., because the neighbor's Wi-Fi is not in the trusted library) that it cannot be used to validate the user's identity (e.g., it is noise). The processor may then weight the neighbor's Wi-Fi with a zero, meaning that it does not go into the determination of validating a user's identity during a transaction. In some embodiments, noise could be a WiFi SSID, router MAC, or other devices not owned and/or verified by a verified user.

In some embodiments, after operation 304, the method 300 may proceed to operation 306. At operation 306, the processor may combine the first weight and the second weight. In some embodiments, any statistical combination of the first weight and the second weight may be used (e.g., averaging, adding, etc.). After operation 306, the method 300 may proceed to decision block 308. If, at decision block 308, the processor determines that the combined weights are not below (e.g., are above) a predetermined threshold, the method 300 may end.

For example, the threshold for verifying a user's identity may be 80, and the weights associated with two or more of the user's devices present during the initiation of a verification event may be 90. Therefore, with a high degree of confidence that the user wants the verification event to process, the processor may allow the processing of the verification event.

If, at decision block 308, the processor determines that the combination of weights is below a predetermined threshold, the method 300 may proceed to operation 310. At operation 310, the processor may prevent the processing of the first verification event. In some embodiments, after operation 310, the method 300 may proceed to operation 312. At operation 312, the processor may alert the verified user to an attempt to process the first verification event. In some embodiments, after operation 312, the method 300 may end. In some embodiments, if at decision block 308, the processor determines that the combination of the weights is below a predetermined threshold, the method 300 at operation 310, may allow the processing of the first verification event (e.g., a low weight score could be used to determine that a verified user is prompting the verification event).

In some embodiments, operations 310 and 312 may be done simultaneously. In some embodiments, the processor may additionally suggest a solution to the attempted processing of the first verification event. For example, two or more devices in a predetermined area may not have met a threshold value of 70 during a purchase at a store. A processor trying to process the purchase may then prevent the purchase from processing and alert the purchaser making the purchase via a text message that the attempt was prevented. The alert may additionally request that the purchaser turn on the Bluetooth function of one of the two or more devices to verify the purchaser's identity.

In some embodiments, the processor may alert a manager (e.g., cashier, poll-taker, etc.) to ask for additional verification of the verified user's identity (e.g., passport, driver's license, etc.). In some embodiments, if the combination of weights is below the threshold, the processor may ask the user to input a password, and the processor may approve the transaction if the password is correct. In some embodiments, the predetermined threshold may increase or decrease depending on the type of verification event. For example, if groceries are being purchased, the predetermined threshold may be lower than if a computer is being purchased. Or, if the verification event is boarding a plane, the threshold may be higher than if checking out a library book.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
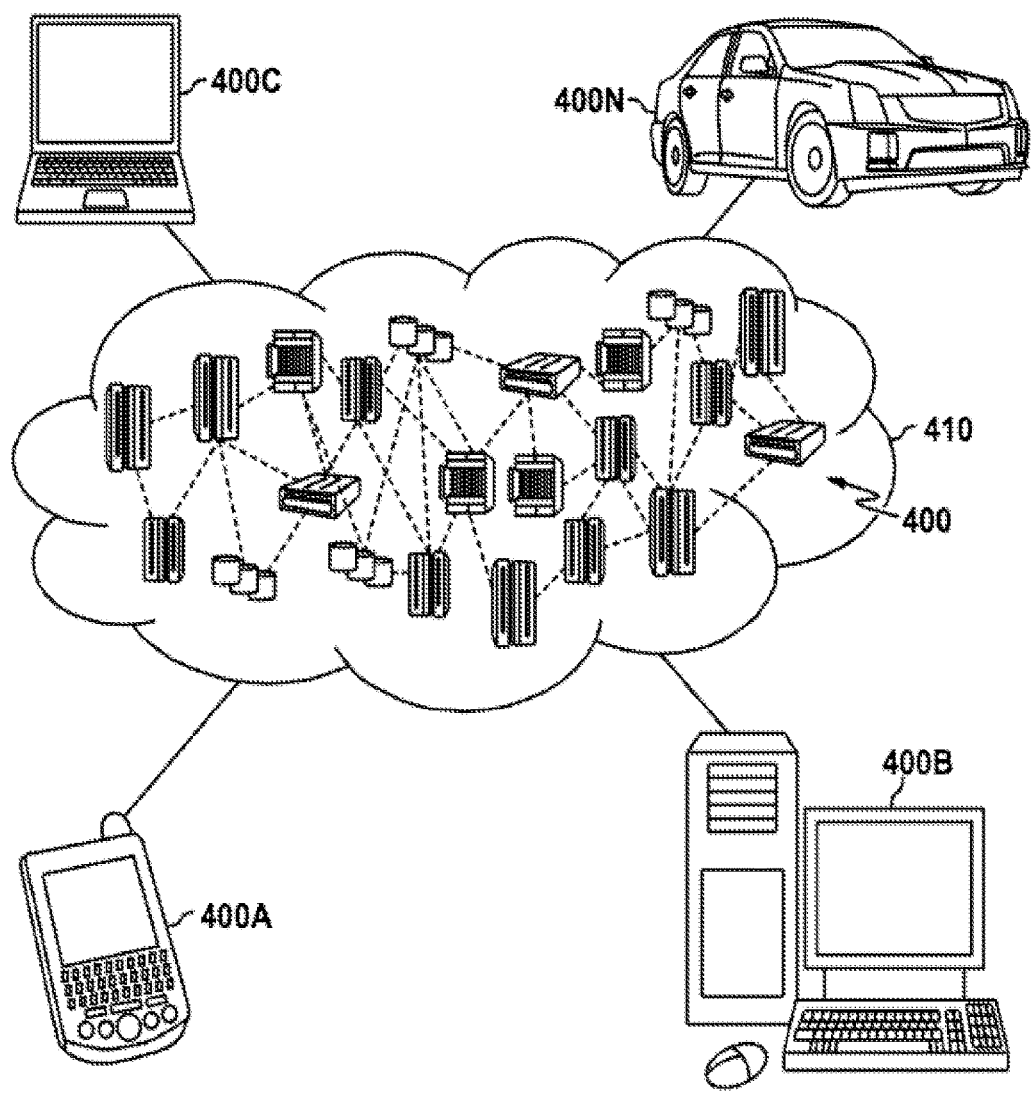
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
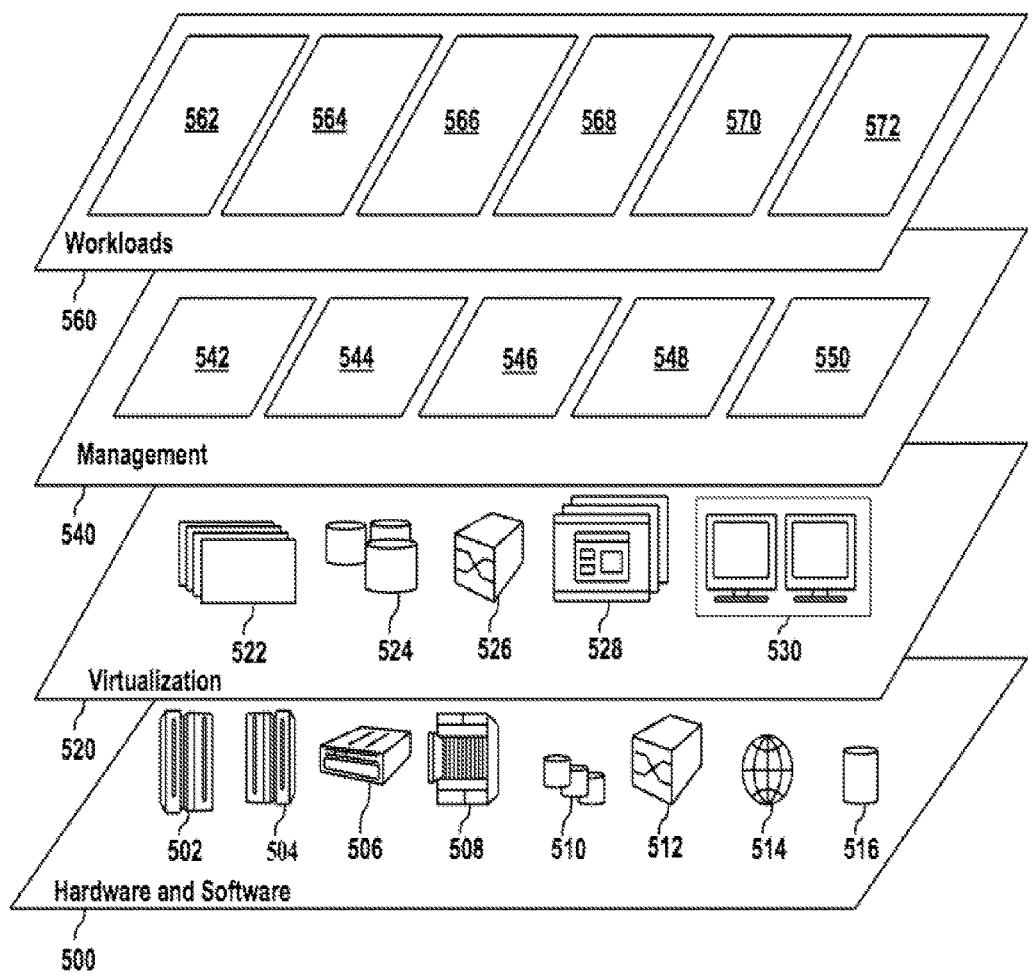
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the invention are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and mobile desktop 572.

Figure 6:
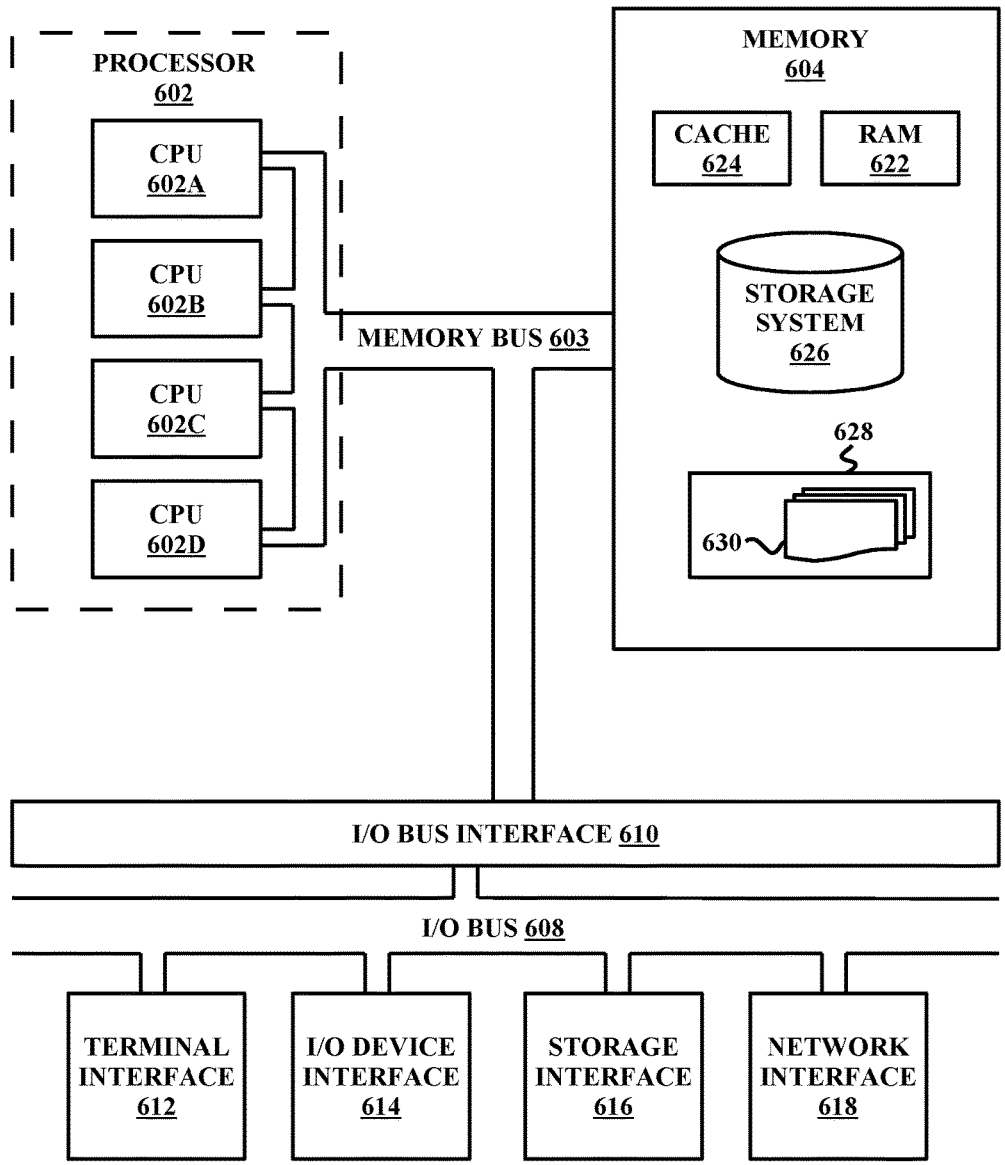
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
    initiating, by a processor, a first verification event;
    identifying two or more devices that are within a predetermined area of the processor during the initiating of the first verification event;
    identifying that one device of the two or more devices is not properly communicating with the processor, wherein the processor identifies that the one device is not properly communicating by the processor not being able to determine that the one device belongs to the verified user, the processor not being able to determine that the one device belongs to the verified user due to noise during the first verification event, wherein noise is a communication interference generated by one or more devices not belonging to the verified user;
    alerting the verified user to activate a communication channel on the one device, the activation of the communication channel indicating to the processor that the one device belongs to the verified user and is not noise;
    alerting the verified user to add the one device to a library;
    verifying an identity of a verified user based on the two or more devices, wherein verifying the identity of the verified user based on the two or more devices includes:
        accessing the library, wherein the library includes a list of the two or more devices as being authorized by the verified user to allow the processing of one or more verification events, wherein the two or more devices are authorized by the verified user registering the two or more devices into the library before the initiation of the first verification event, and
        determining that a combination of the two or more devices confirms the identity of the verified user; and
    processing the first verification event in response to verifying the identity of the verified user.

2. The method of claim 1, wherein determining that the combination of the two or more devices confirms the identity of the verified user further comprises:
    identifying a first device, wherein the first device is associated with a first weight;
    identifying a second device, wherein the second device is associated with a second weight;
    combining the first weight and the second weight; and
    determining that the combination of the first weight and the second weight is above a predetermined threshold.

3. The method of claim 1, wherein determining that the combination of the two or more devices confirms the identity of the verified user further comprises:
    identifying a first device, wherein the first device is associated with a first weight;
    identifying a second device, wherein the second device is associated with a second weight;
    combining the first weight and the second weight;
    determining that the combination of the first weight and the second weight is below a predetermined threshold;
    preventing the processing of the first verification event; and
    alerting the verified user to an attempt to process the first verification event.

4. The method of claim 1 further comprising:
    initiating, by the processor, a second verification event;
    identifying the two or more devices are within a predetermined area of the processor during the initiating of the second verification event;
    determining that the two or more devices belong to the verified user; and
    processing the second verification event.

5. The method of claim 4 further comprising:
    identifying that one device of the two or more devices has been present during the initiation of both the first verification event and the second verification event;
    determining that the one device is not in the library; and
    adding, automatically, the one device to the library.

6. The method of claim 5, further comprising:
associating a third weight to the one device, wherein the third weight is above the first weight and the second weight, the third weight determined to be above the first weight and the second weight based on the one device being identified during the initiation of both the first and second verification events, and based on the one device being identified as non-mobile.

7. The method of claim 1, wherein verifying the identity of the verified user based on the two or more devices further includes:
assigning one or more authentication codes that correspond to each of the two or more devices, wherein the one or more authentication codes change after a predetermined period of time;
transferring the one or more authentication codes to a controller;
receiving, from the controller, an authorization code that is associated with the one or more authentication codes; and
determining, in response to receiving the authorization code from the controller, that the two or more devices belong to the verified user.

8. A system comprising:
a memory; and
a processor in communication with the memory, the processor being configured to perform operations comprising:
initiating, by a processor, a first verification event;
identifying two or more devices that are within a predetermined area of the processor during the initiating of the first verification event;
identifying that one device of the two or more devices is not properly communicating with the processor, wherein the processor identifies that the one device is not properly communicating by the processor not being able to determine that the one device belongs to the verified user, the processor not being able to determine that the one device belongs to the verified user due to noise during the first verification event, wherein noise is a communication interference generated by one or more devices not belonging to the verified user;
alerting the verified user to activate a communication channel on the one device, the activation of the communication channel indicating to the processor that the one device belongs to the verified user and is not noise;
alerting the verified user to add the one device to a library;
verifying an identity of a verified user based on the two or more devices, wherein verifying the identity of the verified user based on the two or more devices includes:
accessing the library, wherein the library includes a list of the two or more devices as being authorized by the verified user to allow the processing of one or more verification events, wherein the two or more devices are authorized by the verified user registering the two or more devices into the library before the initiation of the first verification event, and
determining that a combination of the two or more devices confirms the identity of the verified user; and
processing the first verification event in response to verifying the identity of the verified user.

9. The system of claim 8, wherein determining that the combination of the two or more devices confirms the identity of the verified user further comprises:
identifying a first device, wherein the first device is associated with a first weight;
identifying a second device, wherein the second device is associated with a second weight;
combining the first weight and the second weight; and
determining that the combination of the first weight and the second weight is above a predetermined threshold.

10. The system of claim 8, wherein determining that the combination of the two or more devices confirms the identity of the verified user further comprises:
identifying a first device, wherein the first device is associated with a first weight;
identifying a second device, wherein the second device is associated with a second weight;
combining the first weight and the second weight;
determining that the combination of the first weight and the second weight is below a predetermined threshold;
preventing the processing of the first verification event; and
alerting the verified user to an attempt to process the first verification event.

11. The system of claim 8 further comprising:
initiating, by the processor, a second verification event;
identifying the two or more devices are within a predetermined area of the processor during the initiating of the second verification event;
determining that the two or more devices belong to the verified user; and
processing the second verification event.

12. The system of claim 11 further comprising:
identifying that one device of the two or more devices has been present during the initiation of both the first verification event and the second verification event;
determining that the one device is not in the library; and
adding, automatically, the one device to the library.

13. A computer program product comprising a computer readable storage medium having program instructions embodied therewith, the program instructions executable by a processor to cause the processor to perform a method, the method comprising:
initiating, by a processor, a first verification event;
identifying two or more devices that are within a predetermined area of the processor during the initiating of the first verification event;
identifying that one device of the two or more devices is not properly communicating with the processor, wherein the processor identifies that the one device is not properly communicating by the processor not being able to determine that the one device belongs to the verified user, the processor not being able to determine that the one device belongs to the verified user due to noise during the first verification event, wherein noise is a communication interference generated by one or more devices not belonging to the verified user;
alerting the verified user to activate a communication channel on the one device, the activation of the communication channel indicating to the processor that the one device belongs to the verified user and is not noise;
alerting the verified user to add the one device to a library;
verifying an identity of a verified user based on the two or more devices, wherein verifying the identity of the verified user based on the two or more devices includes:
accessing the library, wherein the library includes a list of the two or more devices as being authorized by the verified user to allow the processing of one or more verification events, wherein the two or more devices are authorized by the verified user registering the two or more devices into the library before the initiation of the first verification event, and determining that a combination of the two or more devices confirms the identity of the verified user; and processing the first verification event in response to verifying the identity of the verified user.

14. The computer program product of claim 13, wherein determining that the combination of the two or more devices confirms the identity of the verified user further comprises:

identifying a first device, wherein the first device is associated with a first weight;

identifying a second device, wherein the second device is associated with a second weight;

combining the first weight and the second weight; and determining that the combination of the first weight and the second weight is above a predetermined threshold.

15. The computer program product of claim 13, wherein determining that the combination of the two or more devices confirms the identity of the verified user further comprises:

identifying a first device, wherein the first device is associated with a first weight;

identifying a second device, wherein the second device is associated with a second weight;

combining the first weight and the second weight;

determining that the combination of the first weight and the second weight is below a predetermined threshold;

preventing the processing of the first verification event; and alerting the verified user to an attempt to process the first verification event.

16. The computer program product of claim 13 further comprising:

initiating, by the processor, a second verification event;

identifying the two or more devices are within a predetermined area of the processor during the initiating of the second verification event;

determining that the two or more devices belong to the verified user;

processing the second verification event;

identifying that one device of the two or more devices has been present during the initiation of both the first verification event and the second verification event;

determining that the one device is not in the library; and adding, automatically, the one device to the library.

* * * * *